(12) United States Patent
Munakata et al.

(10) Patent No.: US 12,717,438 B2
(45) Date of Patent: Aug. 25, 2026

(54) CONTROLLER AND COMPUTER

(71) Applicant: Wacom Co., Ltd., Saitama (JP)

(72) Inventors: Hiroshi Munakata, Saitama (JP); Jun Hasegawa, Saitama (JP); Futa Imata, Saitama (JP); Hiroshi Fujioka, Saitama (JP); Yuta Sato, Saitama (JP); Kiyokazu Sakai, Saitama (JP); Ryoichi Kikuchi, Saitama (JP); Naoya Nishizawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/491,424

(22) Filed: Oct. 20, 2023

(65) Prior Publication Data

US 2024/0045536 A1 Feb. 8, 2024

Related U.S. Application Data

(63) Continuation of application No. PCT/JP2022/006951, filed on Feb. 21, 2022.

(30) Foreign Application Priority Data

Apr. 23, 2021 (JP) ................................ 2021-073433
Aug. 4, 2021 (JP) ................................ 2021-128570

(51) Int. Cl.
*G06F 3/041* (2006.01)
*G06F 3/01* (2006.01)
(Continued)

(52) U.S. Cl.
CPC ........... *G06F 3/0414* (2013.01); *G06F 3/011* (2013.01); *G06F 3/016* (2013.01); *G06F 3/0304* (2013.01);
(Continued)

(58) Field of Classification Search
CPC ............... G06F 2203/04105; G06F 2203/0331
See application file for complete search history.

(56) References Cited

U.S. PATENT DOCUMENTS 6,259,438 B1 7/2001 Fleck et al.
2009/0114459 A1* 5/2009 Fukushima ......... G06F 3/03545 178/19.03
(Continued)

FOREIGN PATENT DOCUMENTS

CN 111837096 A 10/2020
CN 112041789 A 12/2020
(Continued)

OTHER PUBLICATIONS

English Translation of the International Search Report dated May 10, 2022, for the corresponding International Patent Application No. PCT/JP2022/006951, 3 pages.
(Continued)

*Primary Examiner* — Dong Hui Liang
(74) *Attorney, Agent, or Firm* — Seed Intellectual Property Law Group LLP

(57) ABSTRACT

To provide a controller that can reduce a sense of discomfort felt by a user. A pen-type controller with a grip according to the present disclosure includes a pen part that is formed in a pen shape, a grip part that intersects an axial direction of the pen part, and a battery that is arranged in the grip part.

18 Claims, 12 Drawing Sheets

(51) Int. Cl.
*G06F 3/03* (2006.01)
*G06F 3/0354* (2013.01)
*G06F 3/044* (2006.01)

(52) U.S. Cl.
CPC .......... *G06F 3/03545* (2013.01); *G06F 3/044* (2013.01); *G06F 2203/04105* (2013.01)

(56) References Cited

U.S. PATENT DOCUMENTS

2009/0267896 A1* 10/2009 Hiramatsu ......... G06V 30/1423 345/157
2009/0309616 A1* 12/2009 Klinghult .............. G06F 3/0488 345/174
2011/0018743 A1 1/2011 Matsuzawa
2013/0234967 A1* 9/2013 Stoddard ............. G06F 3/03545 345/173
2013/0249823 A1* 9/2013 Ahn .................... G06F 3/03545 345/173
2014/0219702 A1 8/2014 Pincus et al.
2014/0320462 A1* 10/2014 Tseng .................. G06F 3/03545 345/179
2016/0179222 A1* 6/2016 Chang ................. G06F 3/03545 345/179
2020/0042111 A1 2/2020 Connellan et al.
2020/0387287 A1* 12/2020 Ravasz ................... G06F 3/011
2021/0048897 A1 2/2021 Munakata et al.
2021/0072847 A1* 3/2021 Ide .......................... G06F 3/017
2021/0124437 A1* 4/2021 Yang ................... G06F 3/03545
2022/0067356 A1* 3/2022 Suto ........................ G06F 3/011

FOREIGN PATENT DOCUMENTS

EP 3770732 A1 1/2021
JP 2000047805 A 2/2000
JP 2006259267 A * 9/2006
JP 2009175890 A 8/2009
JP 2011022967 A 2/2011
JP 2018001721 A 1/2018
JP 2019168506 A 10/2019
JP WO2019181118 A1 3/2021
KR 101368444 B1 2/2014
WO 2019102825 A1 5/2019
WO WO 2019220803 A1 11/2019

OTHER PUBLICATIONS

Korean Office Action, dated Apr. 17, 2026, for corresponding Korean Patent Application No. 10-2025-7020578. (13 pages) (with English translation).

* cited by examiner

CONTROLLER AND COMPUTER

BACKGROUND

Technical Field

The present disclosure relates to a controller and a computer, and particularly to a controller used in a space configured by using an XR (Extended Reality) technology (hereinafter, such a space will be referred to as an "XR space") such as VR (Virtual Reality), AR (Augmented Reality), MR (Mixed Reality), or SR (Substitutional Reality) and a computer capable of communicating with such a controller.

Description of the Related Art

A pen-type controller is used by a user to indicate a position in the XR space. Patent Document 1 discloses an example of the pen-type controller.

A battery is incorporated in the pen-type controller in some cases. The electric power supplied from the battery is used to operate integrated circuits, to establish communication via short-distance wireless communication, and the like.

PRIOR ART DOCUMENT

Patent Document

Patent Document 1: PCT Patent Publication No. WO2019/220803 Specification.

BRIEF SUMMARY

Technical Problem

However, the pen-type controller incorporating a battery has a problem that the weight thereof is unbalanced, which causes the user to feel a sense of discomfort when the user uses the controller.

Therefore, one of the objects of the present disclosure is to provide a controller that can reduce a sense of discomfort felt by a user.

In addition, in the case where a pen-type controller is provided with a pressure pad, it is conceivable to provide a plurality of pressure pads.

Another object of the present disclosure is to provide a computer that operates based on information transmitted from a controller having a plurality of pressure pads.

Technical Solution

A controller according to a first aspect of the present disclosure is a controller including a pen part that is formed in a pen shape, a grip part that intersects an axial direction of the pen part, and a battery that is arranged in the grip part.

A computer according to a second aspect of the present disclosure is a computer that communicates with a controller including a pen part that is formed in a pen shape, a grip part that intersects an axial direction of the pen part, and a battery that is arranged in the grip part. The pen part has a first pressure pad including a first capacitive touch sensor and a first pressure sensitive sensor and a second pressure pad including a second capacitive touch sensor and a second pressure sensitive sensor. The computer includes a communication device that, in operation, receives information transmitted from the controller, and a processor. The processor, in operation, performs control, based on the information received by the communication device and detected by the first capacitive touch sensor or the second capacitive touch sensor, and outputs a pen pressure value that is the information received by the communication device and is related to a pressing value detected by the first pressure sensitive sensor the second pressure sensitive sensor.

Advantageous Effect

According to the first aspect of the present disclosure, it is possible to provide a controller that can reduce a sense of discomfort felt by a user.

According to the second aspect of the present disclosure, it is possible to provide a computer that operates based on information transmitted from a controller having a plurality of pressure pads.

DETAILED DESCRIPTION

Hereinafter, an embodiment of the present disclosure will be described in detail with reference to the attached drawings.

Figure 1:
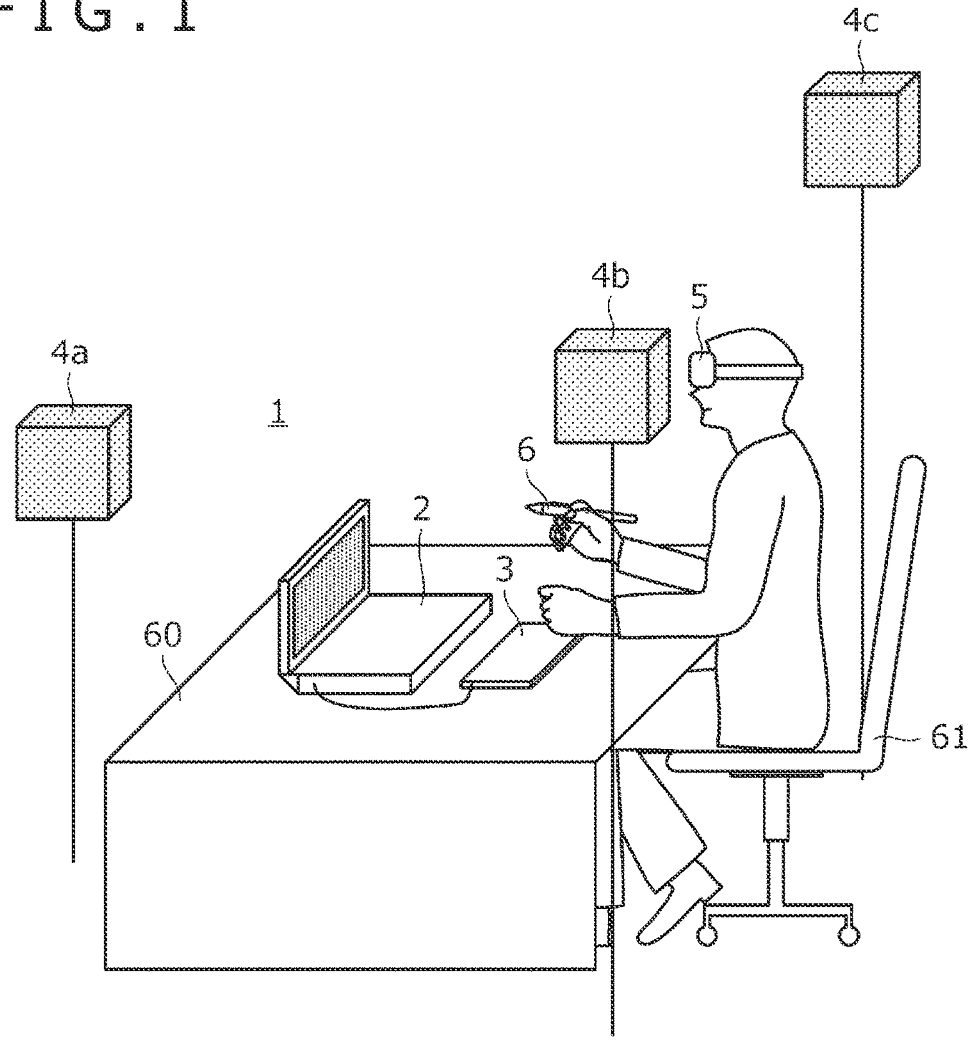
FIG. 1 is a diagram for illustrating a use state of a tracking system 1 including a pen-type controller 6 with a grip according to an embodiment of the present disclosure.

FIG. 1 is a diagram for illustrating a use state of a tracking system 1 including a pen-type controller 6 with a grip according to the present embodiment. As illustrated in FIG. 1, the tracking system 1 has a computer 2, a position detection device 3, three cameras 4*a* to 4*c*, and a head-mounted display 5 in addition to the controller 6. The computer 2 and each of the position detection device 3, the cameras 4*a* to 4*c*, the head-mounted display 5, and the controller 6 are configured to be able to communicate with each other in a wired or wireless manner.

As illustrated in FIG. 1, a user uses the tracking system 1 while sitting on a desk chair 61, mounting the head-mounted display 5 on the head, and holding the controller 6 with the right hand. An XR space rendered by the computer 2 is displayed on a display surface of the head-mounted display 5, and the user operates the controller 6 above a desk 60 while viewing this XR space. The controller 6 is a pen-type device with a grip attached to the pen, and controls (specifically, drawing, moving, and the like) a 3D (Three-dimensional) object displayed in the XR space. Further, the controller 6 is used to perform 2D input by using the position detection device 3.

In the example of FIG. 1, the computer 2 includes a notebook-type personal computer arranged in the center of the desk 60. However, it is not necessary to arrange the computer 2 in the center of the desk 60, and it is only necessary to arrange it at a position where it can communicate with the position detection device 3, the cameras 4*a* to 4*c*, the head-mounted display 5, and the controller 6. In addition, the computer 2 can include various computers such as a desktop-type personal computer, a tablet-type personal computer, a smart phone, and a server computer, in addition to the notebook-type personal computer.

Figure 2:
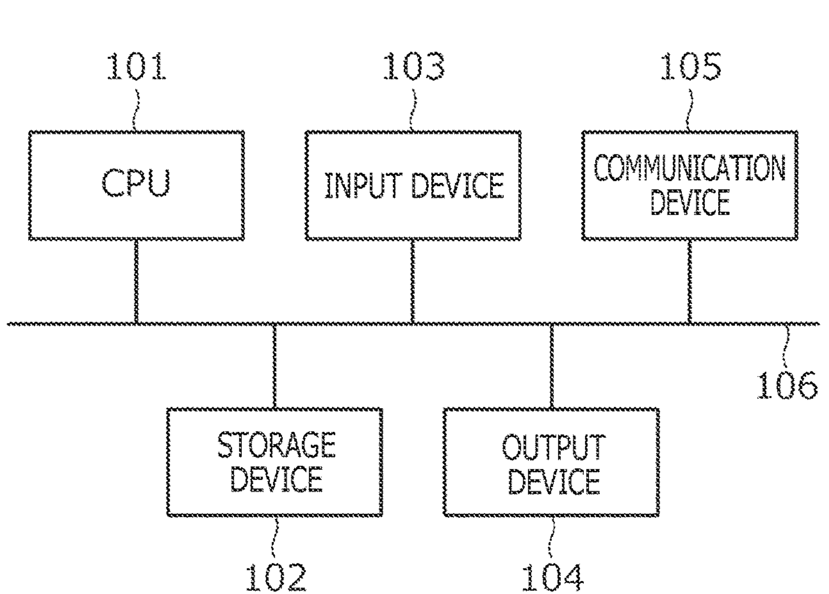
FIG. 2 is a diagram for illustrating an example of a hardware configuration of a computer 2.

FIG. 2 is a diagram for illustrating an example of a hardware configuration of the computer 2. As illustrated in FIG. 2, the computer 2 has a CPU (Central Processing Unit) 101, a storage device 102, an input device 103, an output device 104, and a communication device 105.

The CPU 101 is a processor that controls each unit of the computer 2 and that reads and executes various programs stored in the storage device 102. The processing, to be described later, executed by the computer 2 is achieved by the CPU 101 executing the program stored in the storage device 102.

The storage device 102 includes a main storage device such as a DRAM (Dynamic Random Access Memory) and an auxiliary storage device such as a hard disk. The storage device 102 is a device that stores various programs for executing the operating system and various applications of the computer 2 and data used by these programs.

The input device 103 is a device that accepts an input operation made by the user and that supplies it to the CPU 101, and includes, for example, a keyboard, a mouse, and a touch panel. The output device 104 is a device that outputs the processing result from the CPU 101 to the user, and includes, for example, a display and a speaker. The communication device 105 is a device for communicating with external devices including the position detection device 3, the cameras 4*a* to 4*c*, the head-mounted display 5, and the controller 6, and transmits and receives data to and from these devices under the control of the CPU 101.

Described with reference to FIG. 1 again, the computer 2 periodically detects the position and tilt of each of the head-mounted display 5, the controller 6, and the position detection device 3 based on images captured by the cameras 4*a* to 4*c*, and thus tracks these movements. The detection of the position and tilt is specifically executed by using one or more LEDs (Light Emitting Diodes) attached to a surface of each of the head-mounted display 5, the controller 6, and the position detection device 3. That is, the computer 2 is configured to detect the position and tilt of each device by detecting light emitted by these LEDs in the images captured by the cameras 4*a* to 4*c*.

The computer 2 performs processing of generating the XR space and the 3D object to be displayed therein, based on the movement of each device being tracked and the state of each switch or the like (described later) provided in the controller 6, rendering the generated XR space and 3D object, and transmitting them to the head-mounted display 5. The head-mounted display 5 displays the XR space including one or more 3D objects, by displaying the rendered image transmitted from the computer 2.

In the example of FIG. 1, the position detection device 3 includes a tablet arranged at a position corresponding to the front side of the computer 2 on an upper surface of the desk 60 when viewed from the user. However, it is not necessary to arrange the position detection device 3 at this position, and it is only necessary to arrange it within the reach of the user sitting on the desk chair 61. In addition, the position detection device 3 and the computer 2 may be configured as, for example, an integrated device such as a tablet terminal.

The position detection device 3 has a function of periodically detecting the position of a pen tip of the controller 6 on a touch surface thereof and sequentially transmitting the detected position to the computer 2. The computer 2 generates and renders stroke data configuring the 2D object or 3D object, based on the transmitted position. This rendering includes processing of controlling the thickness or transparency of the line to be drawn, according to a pen pressure value described later. Although the specific method of the position detection by the position detection device 3 is not limited to a particular one, it is preferable to use, for example, an active capacitive method or a capacitive induction method.

Each of the cameras 4*a* to 4*c* is an imaging device for capturing still images or moving images, and is configured to sequentially supply the captured images to the computer 2. The camera 4*a* is arranged at a position opposite to the user across the desk 60, the camera 4*b* is arranged above the left side of the user, and the camera 4*c* is arranged above the right side of the user, in such directions that images of the upper surface of the desk 60 can be captured.

Figure 3:
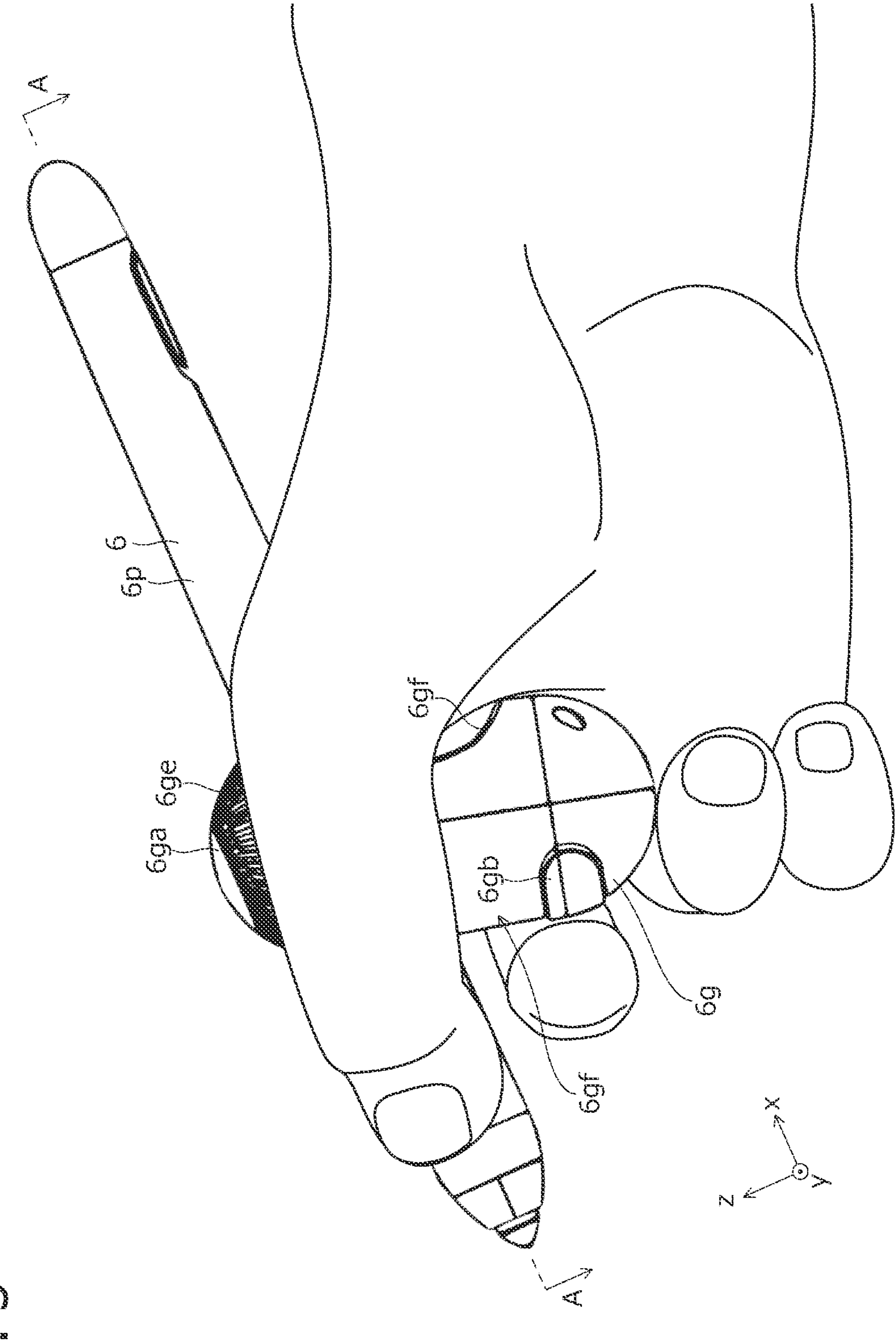
FIG. 3 is a diagram for illustrating a state in which a user holds the controller 6 with the right hand.
Figure 4A:
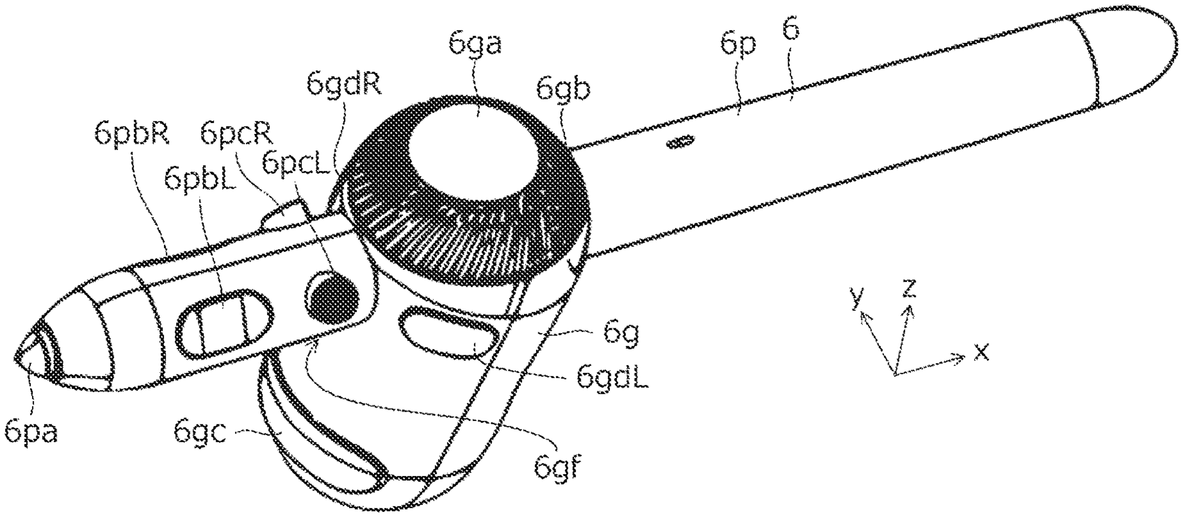
FIG. 4A and FIG. 4B are perspective views of the controller 6 when viewed from angles different from each other.
Figure 4B:
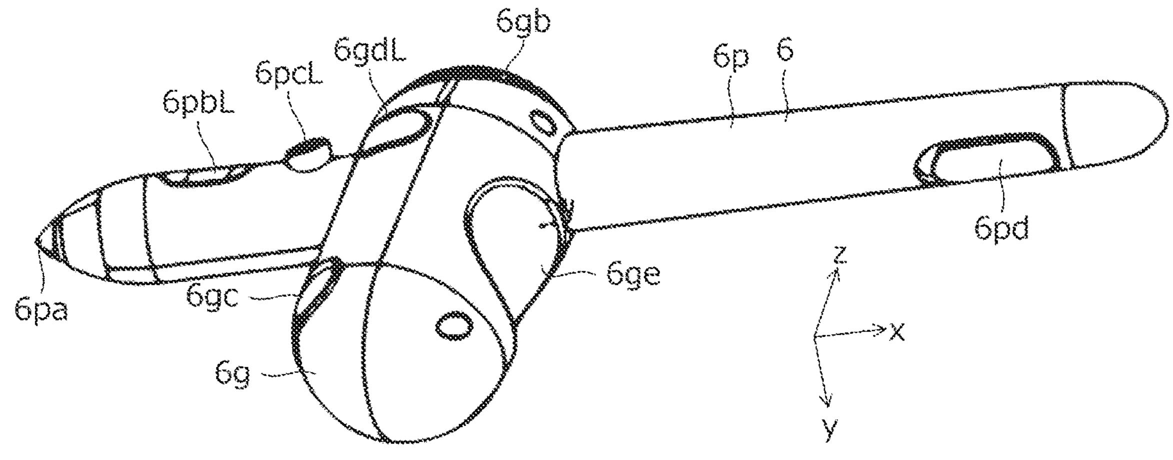
Figure 5:
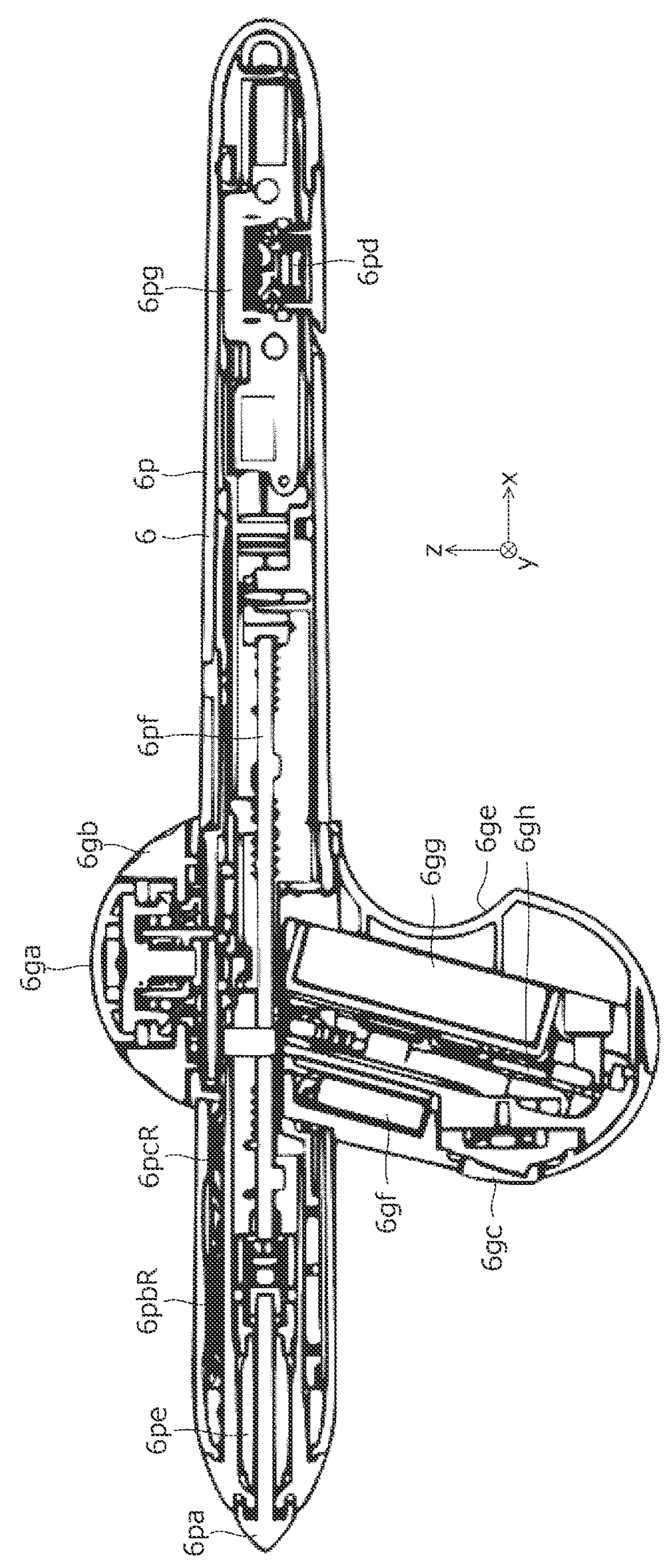
FIG. 5 is a cross-sectional view of the controller 6 corresponding to an A-A line illustrated in FIG. 3.
Figures 6A, 6B:
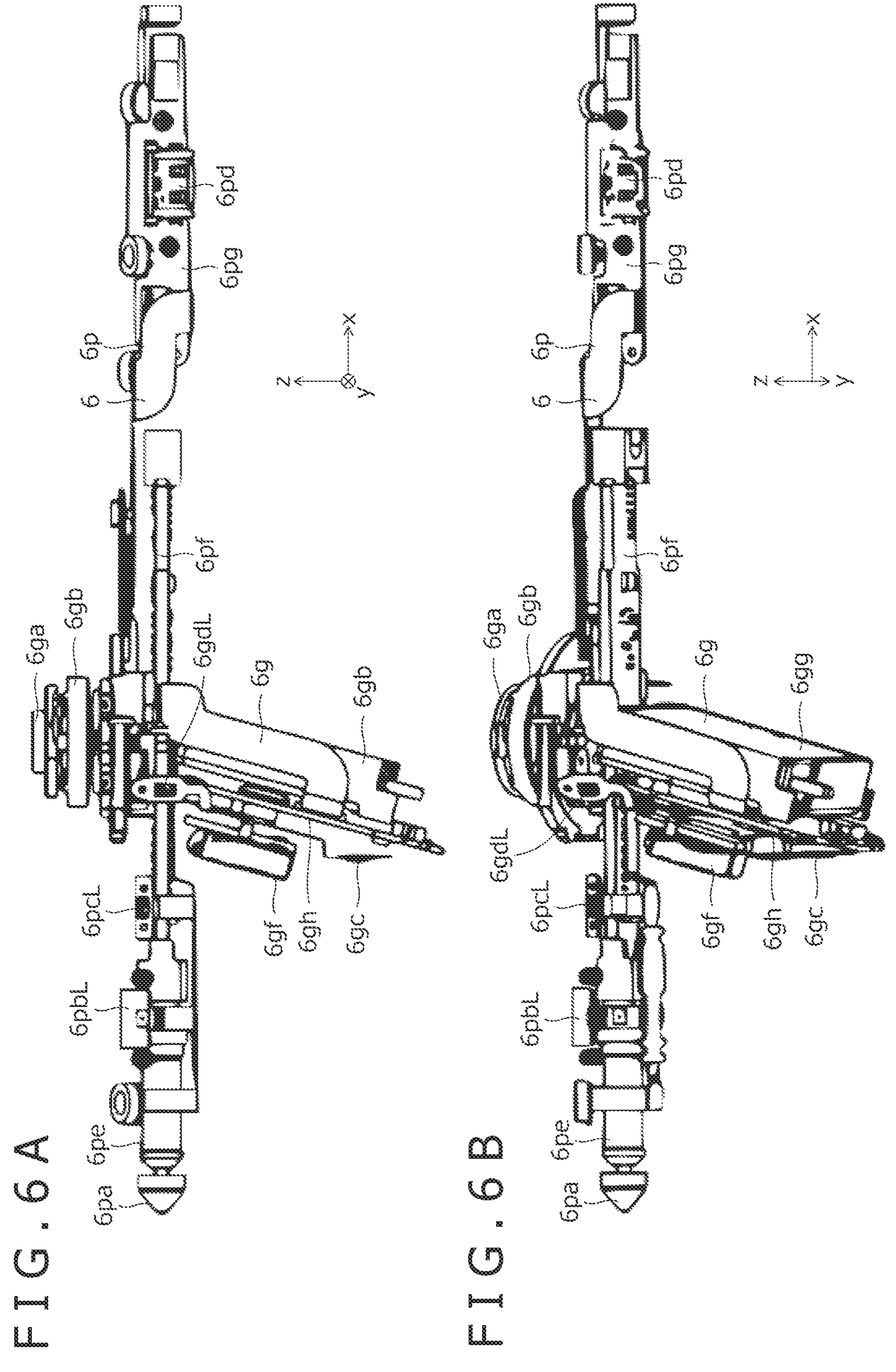
FIG. 6A and FIG. 6B are exploded perspective views each illustrating an internal structure of the controller 6 when viewed from angles different from each other.
Figure 7:
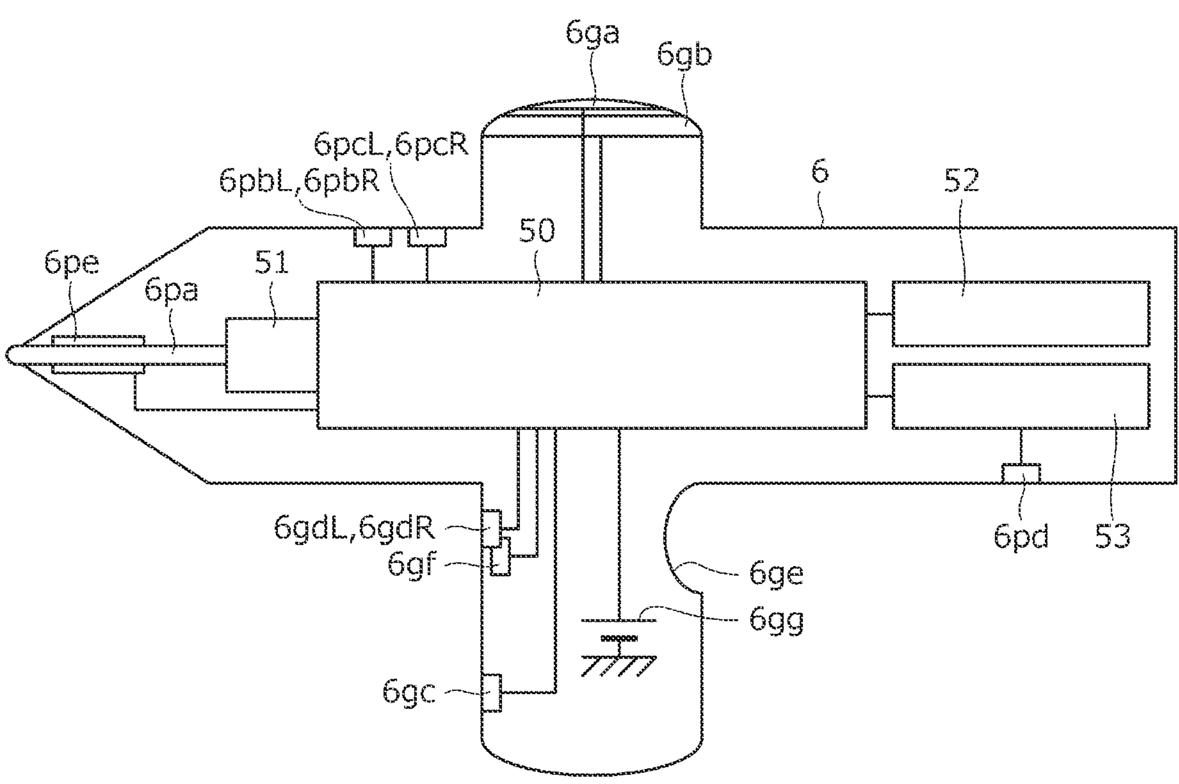
FIG. 7 is a rough block diagram for illustrating functional blocks of the controller 6.

FIG. 3 is a diagram for illustrating a state in which the user holds the controller 6 with the right hand. In addition, FIG. 4A and FIG. 4B are perspective views of the controller 6 when viewed from angles different from each other, FIG. 5 is a cross-sectional view of the controller 6 corresponding to an A-A line illustrated in FIG. 3, FIG. 6A and FIG. 6B are exploded perspective views each illustrating an internal structure of the controller 6 when viewed from angles different from each other, and FIG. 7 is a rough block diagram for illustrating functional blocks of the controller 6. Hereinafter, the configuration of the controller 6 will be described in detail with reference to these drawings.

First, as illustrated in FIG. 4A and FIG. 4B, the controller 6 has a pen part 6*p* formed in a pen shape and a grip part 6*g* fixed to the pen part 6*p* such that the longitudinal direction thereof intersects the axial direction of the pen part 6*p*. When holding the controller 6, the user holds the controller 6 in such a manner that the grip part 6*g* is gripped by the thumb, the index finger, and the middle finger as illustrated in FIG. 3. Hereinafter, the axial direction of the pen part 6*p* is referred to as an x direction, a direction that extends in a plane formed by the x direction and the longitudinal direction of the grip part 6*g* and that is perpendicular to the x direction is referred to as a z direction, and a direction perpendicular to each of the x direction and the z direction is referred to as a y direction.

As illustrated in FIG. 4A and FIG. 4B, a nib 6*pa* is provided at a pen tip of the pen part 6*p*, and left and right pressure pads 6*pb*L and 6*pb*R, left and right shift buttons 6*pc*L and 6*pc*R, and a USB (Universal Serial Bus) connector 6*pd* are provided on side surfaces. In addition, the grip part 6*g* is provided with a tactile top button 6*ga*, a dial button 6*gb*, a grab button 6*gc*, left and right tactile buttons 6*gd*L and 6*gd*R, and a recess portion 6*ge*. Besides these, as illustrated in FIG. 5, FIG. 6A, and FIG. 6B, a pen tip electrode 6*pe*, a printed circuit board assembly 6*pf*, and a flexible printed circuit board 6*pg* are arranged inside the pen part 6*p*, and a haptic element 6*gf*, a battery 6*gg*, and a main board 6*gh* are arranged inside the grip part 6*g*. Among these components, the printed circuit board assembly 6*pf* is a core component of the controller 6, and the controller 6 is manufactured by mounting other components on the printed circuit board assembly 6*pf* as a finished product.

In addition, as illustrated in FIG. 7, the controller 6 functionally has a processing circuit 50, a pen pressure sensor 51, a wireless communication circuit 52, and a power supply circuit 53. Among these, the processing circuit 50 includes integrated circuits mounted in the printed circuit board assembly 6*pf*, and the wireless communication circuit 52 and the power supply circuit 53 include integrated circuits mounted on the flexible printed circuit board 6*pg*.

The processing circuit 50 is a circuit that functions as a central processing unit of the controller 6. The processing circuit 50 has a function of acquiring the respective states (the operation states and the detection states) of the pressure pads 6*pb*L and 6*pb*R, the shift buttons 6*pc*L and 6*pc*R, the tactile top button 6*ga*, the dial button 6*gb*, the grab button 6*gc*, the tactile buttons 6*gd*L and 6*gd*R, and the pen pressure sensor 51 and supplying the acquired states to the position detection device 3 or the computer 2 through the pen tip electrode 6*pe* or the wireless communication circuit 52, a function of receiving a signal transmitted by the position detection device 3 or the computer 2 through the pen tip electrode 6*pe* or the wireless communication circuit 52, and a function of performing processing according to the signal received from the position detection device 3 or the computer 2. The processing according to the signal received from the position detection device 3 or the computer 2 includes processing of generating and returning a signal according to the received signal and control of the haptic element 6*gf*. The processing circuit 50 also controls the lighting state of each of one or more LEDs attached to the surface of the controller 6.

The wireless communication circuit 52 is a circuit that performs wireless communication such as Bluetooth (registered trademark) and wireless LAN (Local Area Network). The processing circuit 50 uses this wireless communication circuit 52 to communicate with the computer 2 illustrated in FIG. 1.

The nib 6*pa* is a roughly rod-shaped member configuring the pen tip and is arranged such that the tip end thereof slightly protrudes from a casing of the pen part 6*p* while being energized toward the tip end direction. The rear end of the nib 6*pa* abuts against the pen pressure sensor 51. When the user presses the tip end of the nib 6*pa* against the touch surface of the position detection device 3, the nib 6*pa* moves rearward. The pen pressure sensor 51 is a sensor that detects the pressure being applied to the tip end of the nib 6*pa*, by detecting this movement, and notifies the processing circuit 50 of the detected pressure value as a "pen pressure value."

The pen tip electrode 6*pe* is a conductor arranged to surround the nib 6*pa* as illustrated in FIG. 5, FIG. 6A, and FIG. 6B, and is electrically connected to the processing circuit 50 as illustrated in FIG. 7. The processing circuit 50 executes transmission and reception of signals to and from the position detection device 3 via the pen tip electrode 6*pe*. The position detection device 3 detects the position of the nib 6*pa* on the touch surface by using the signals thus transmitted and received, and acquires the above pen pressure value from the processing circuit 50.

The USB connector 6*pd* is a connector to which a USB cable can be connected, and is connected to the processing circuit 50 and the power supply circuit 53. The processing circuit 50 is configured to update its own firmware by firmware from the outside through the USB cable. Meanwhile, the power supply circuit 53 is configured to charge the battery 6*gg* by electric power supplied from the outside through the USB cable. The power supply circuit 53 and the battery 6*gg* are connected to each other by wiring extending from the flexible printed circuit board 6*pg* to the main board 6*gh*. The charged battery 6*gg* supplies operating electric power to the respective parts in the controller 6 including the processing circuit 50 and the haptic element 6*gf*.

In the case of a conventional pen-type controller, the battery 6*gg* is provided at a position in the pen part 6*p*. However, in the controller 6 according to the present embodiment, the battery 6*gg* is provided at a position in the grip part 6*g* as illustrated in FIG. 5. In other words, the battery 6*gg* is arranged on the lower side (the end side which corresponds to one of the opposite ends of the grip part 6*g* in the longitudinal direction and which is farther from the axial direction of the pen part 6*p* when viewed from the printed circuit board assembly 6*pf*) of the printed circuit board assembly 6*pf* arranged in the pen part 6*p*. Further, in other words, the battery 6*gg* is arranged between the haptic element 6*gf* and the recess portion 6*ge*. By adopting such an arrangement, the pen part 6*p* that is positioned on the upper side of the grip part 6*g* gripped by the user can be made lighter than the conventional one, and thus, a sense of discomfort caused in the case where the user grips the grip part 6*g* and operates the controller 6 can be reduced.

Each of the pressure pads 6*pb*L and 6*pb*R is a device having a touch sensor for detecting a finger of the user touching the surface and the position of the finger on the surface, and a pressure sensitive sensor for detecting the pressure being applied to the surface. The specific structures of the pressure pads 6*pb*L and 6*pb*R will be described in detail later with reference to FIG. 8. The detection results from the pressure pads 6*pb*L and 6*pb*R are supplied to the computer 2 through the processing circuit 50 and used for various types of processing. In a specific example, the pressure detected by the pressure sensitive sensor is used for selection and drawing on the application. For example, it is used to control the thickness or transparency of the line to be drawn, according to the pressure, as if it were the pen pressure value described above. Meanwhile, information indicating the presence or absence of touch detected by the touch sensor is used to perform on/off determination of the output of the pressure sensitive sensor and light double-tap.

As illustrated in FIG. 4A, the pressure pads 6*pb*L and 6*pb*R are arranged at positions closer to the pen tip than the grip part 6*g* on the upper surface of the pen part 6*p* in a symmetrical manner across the xz plane. As can be understood from FIG. 3, the user holding the controller 6 with the right hand operates the pressure pad 6*pb*L with the thumb and the pressure pad 6*pb*R with the index finger.

The shift buttons 6*pc*L and 6*pc*R, the grab button 6*gc*, and the tactile buttons 6*gd*L and 6*gd*R are each a switch that can be turned on and off. Each of the shift buttons 6*pc*L and 6*pc*R is assigned to the menu of the application. The grab button 6*gc* is used to grab and move an object. Each of the tactile buttons 6*gd*L and 6*gd*R is used for button assistance such as the right button of a mouse. The processing circuit 50 is configured to also detect the operation states of these switches and supply information based on the detected states to the computer 2 or the position detection device 3. Each of the computer 2 and the position detection device 3 performs processing according to the information thus supplied.

As illustrated in FIG. 4A, the shift buttons 6*pc*L and 6*pc*R are arranged at positions between the pressure pads 6*pb*L and 6*pb*R and the grip part 6*g* on the upper surface of the pen part 6*p* in a symmetrical manner across the xz plane. In addition, the grab button 6*gc* is arranged at a position in the vicinity of the lower end of the side surface of the grip part 6*g* on the pen-tip side. In addition, the tactile buttons 6*gd*L and 6*gd*R are arranged at positions overlapping the pen part 6*p* on the side surface of the grip part 6*g* on the pen-tip side when viewed in the z direction, in a symmetrical manner across the xz plane. As can be understood from FIG. 3, the user holding the controller 6 with the right hand performs the pressing operation of the grab button 6*gc* with the middle finger, the pressing operation of the tactile button 6*gd*R with the index finger, and the pressing operation of the tactile button 6*gd*L with the thumb.

The tactile top button 6*ga* is a switch that functions as a power supply button by a long press. In addition, the dial button 6*gb* is a ring-shaped member configured to be rotatable, and is configured to output the amount of rotation as the operation state. This amount of rotation is used, for example, to rotate the object being selected. The specific structures of the tactile top button 6*ga* and the dial button 6*gb* will be described in detail later with reference to FIG. 12 and FIG. 13. The processing circuit 50 is configured to also detect the operation states of the tactile top button 6*ga* and the dial button 6*gb* and to supply information based on the detected states to the computer 2 or the position detection device 3. Each of the computer 2 and the position detection device 3 performs processing according to the information thus supplied.

As illustrated in FIG. 4A, the dial button 6*gb* is arranged at the upper end (the end which corresponds to one of the opposite ends of the grip part 6*g* in the longitudinal direction and which is closer to the axial direction of the pen part 6*p*) of the grip part 6*g*, and the tactile top button 6*ga* is arranged at the hollow portion of the dial button 6*gb*. As can be understood from FIG. 3, the user holding the controller 6 with the right hand performs the rotary operation of the dial button 6*gb* and the pressing operation of the tactile top button 6*ga* with the thumb. However, since the tactile top button 6*ga* and the dial button 6*gb* are located at positions where the user must intentionally lift the thumb up to the upper end of the grip part 6*g* to operate them, they are exposed without being hidden by the hand of the user in a normal state.

As illustrated in FIG. 3, the recess portion 6*ge* is a portion that exactly fits a portion ranging from the base of the index finger to the base of the thumb in the case where the user grips the controller 6, and is formed to open toward the pen end of the pen part 6*p*. With the recess portion 6*ge* provided in the controller 6, the fatigue of the user using the controller 6 is reduced.

The haptic element 6*gf* illustrated in FIG. 5, FIG. 6A, FIG. 6B, and FIG. 7 is an element that performs an operation for haptics, and includes, for example, a vibrating element. As illustrated in FIG. 5, the haptic element 6*gf* is arranged in the grip part 6*g* in the vicinity of the portion gripped by the user. In other words, the haptic element 6*gf* is provided in the grip part 6*g* at a position adjacent to the pen part 6*p*. The recess portion 6*ge* is positioned on the opposite side of the grip part 6*g* when viewed from the haptic element 6*gf*, which makes it possible to give haptics to the middle finger of the user as can be understood from FIG. 3.

Figure 8:
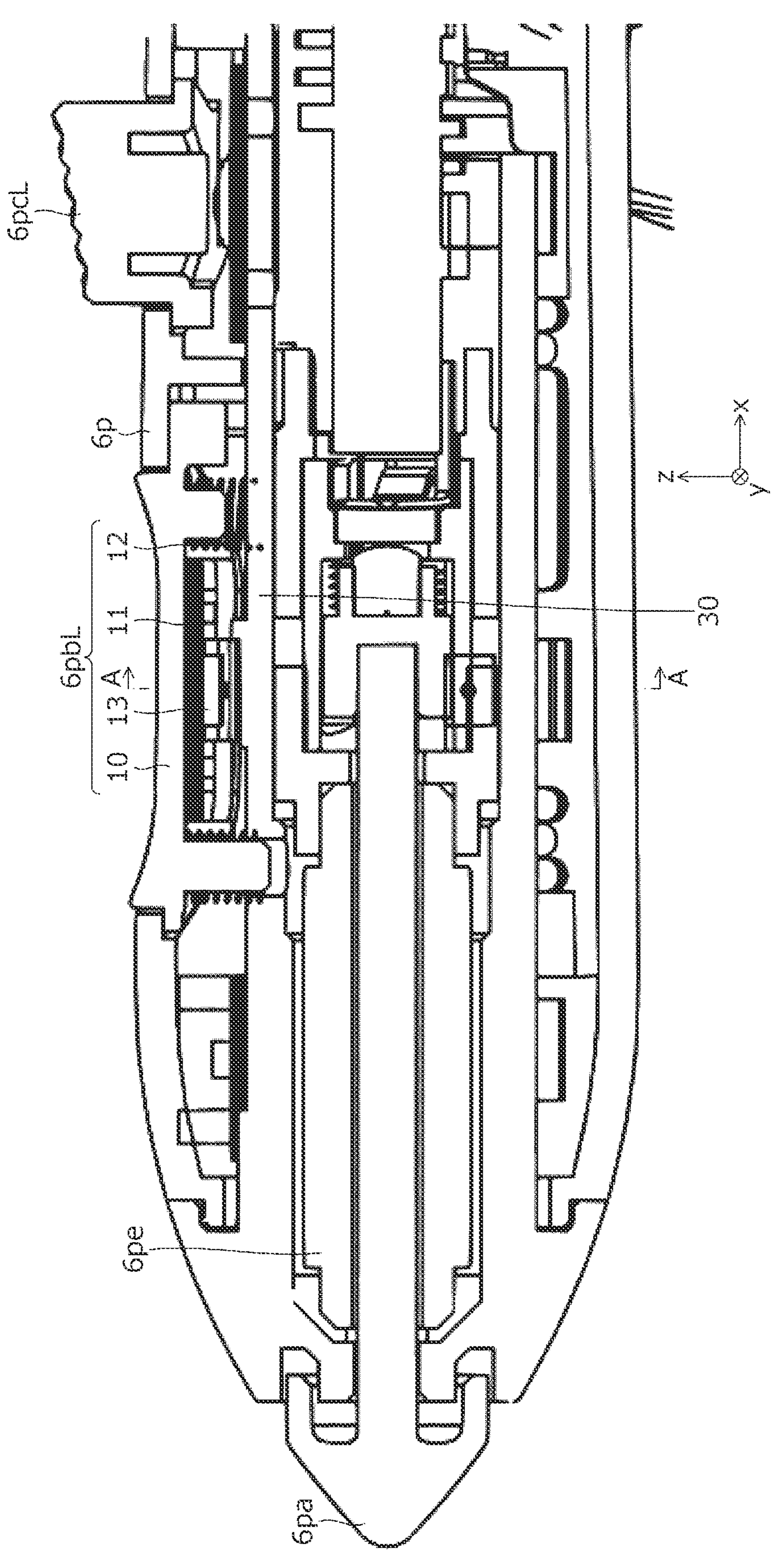
FIG. 8 is a cross-sectional view of the controller 6 including a cross section of a pressure pad 6_pb_L.
Figure 9:
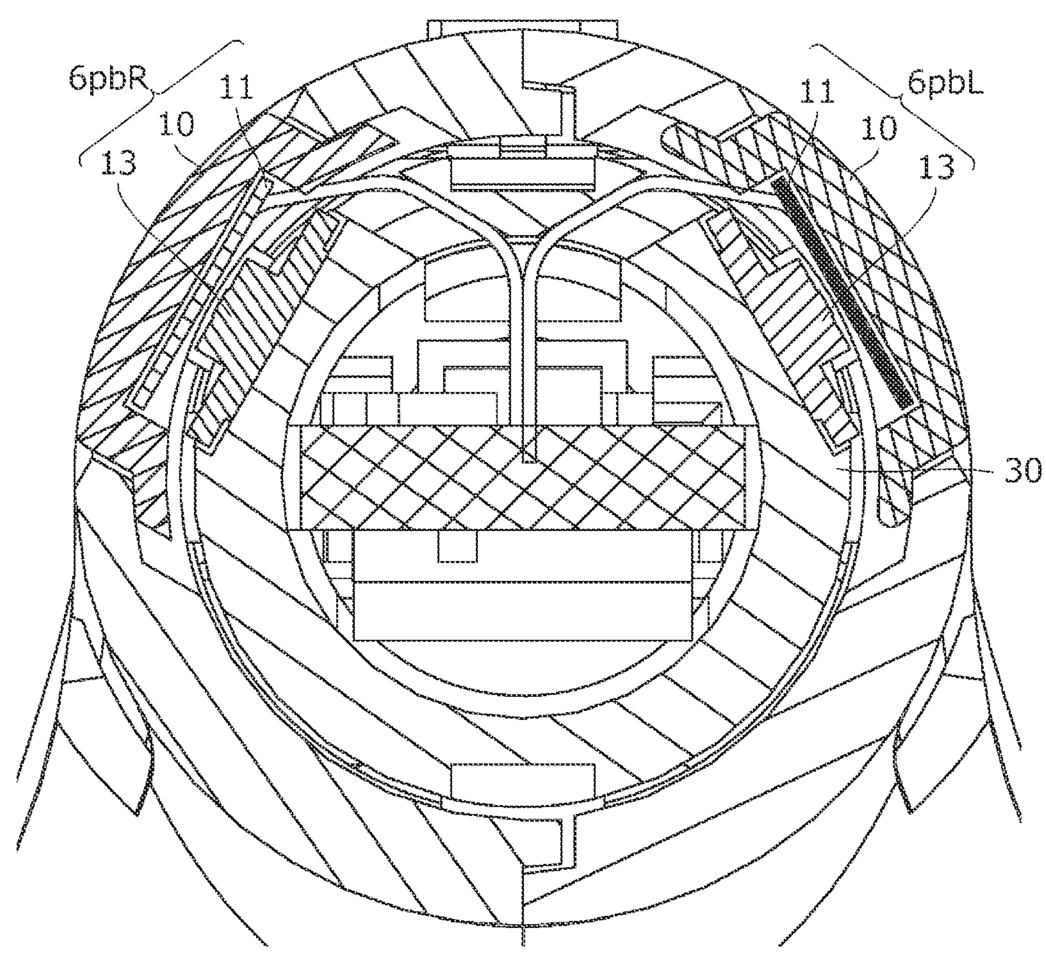
FIG. 9 is a cross-sectional view of the controller 6 taken along an A-A line illustrated in FIG. 8.
Figure 10A:
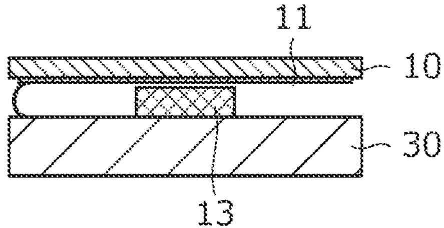
FIG. 10A is a diagram for schematically illustrating a cross-sectional structure of the pressure pad 6_pb_L illustrated in FIG. 8.

FIG. 8 is a cross-sectional view of the controller 6 including a cross section of the pressure pad 6*pb*L. In addition, FIG. 9 is a cross-sectional view of the controller 6 taken along an A-A line illustrated in FIG. 8, and FIG. 10A is a diagram for schematically illustrating the cross-sectional structure of the pressure pad 6*pb*L illustrated in FIG. 8. The cross-sectional structure of the pressure pad 6*pb*L will be described below with reference to these drawings. The pressure pad 6*pb*R also has a similar structure as can be understood from FIG. 9.

As illustrated in FIG. 8, FIG. 9, and FIG. 10A, the pressure pad 6*pb*L has a configuration in which a surface member 10, a capacitive touch sensor 11, a pressure sensitive sensor 13, and an elastic body 12 are arranged on an installation table 30 fixed to the casing of the pen part 6*p*. As illustrated in FIG. 9, the installation table 30 has a cylindrical shape, and the pressure pad 6*pb*L is arranged on the outer peripheral surface thereof. It should be noted that the illustration of the elastic body 12 is omitted in FIG. 10A. The same applies to FIG. 10B to FIG. 10D to be described later.

The surface member 10 is formed of, for example, plastic and is a member whose surface is formed into such a shape that can easily be pressed by the user. The capacitive touch sensor 11 is a self-capacitive or mutual capacitive touch sensor, and is mounted on a rigid flexible board or a film pasted to the lower surface (inner surface) of the surface member 10 in the example of FIG. 10A. It should be noted that the capacitive touch sensor 11 may be formed by printing conductive ink on the lower surface of the surface member 10. The capacitive touch sensor 11 detects a finger of the user touching the surface of the surface member 10 and the position of the finger on the surface of the surface member 10.

The elastic body 12 is an elastic member with one end fixed to the surface member 10 and the other end fixed to the installation table 30, and typically includes a spring as illustrated in FIG. 8. However, the elastic body 12 may include other kinds of elastic bodies such as rubber. The pressure sensitive sensor 13 is a sensor whose resistance value changes according to the pressing force, and is fixed to the surface (outer peripheral surface) of the installation table 30. Specifically, as the pressure sensitive sensor 13, it is possible to use both a sensor with a stroke (a sensor whose shape changes when being pressed) and a sensor without a stroke (a sensor whose shape does not change when being pressed), and it is particularly preferable to use the sensor without a stroke from the viewpoint of preventing the controller 6 itself from moving according to the movement of the finger.

The surface member 10, the capacitive touch sensor 11 (and the rigid flexible board or the like), and the pressure sensitive sensor 13 are fixed to one another. They are configured to be movable in the normal direction of the surface of the surface member 10 within a predetermined range, and are energized outwards by the elastic body 12. With the energizing, in the case where no force is applied to the surface of the surface member 10, a gap is formed between the pressure sensitive sensor 13 and the installation table 30. On the other hand, when the user presses the surface member 10 and the pressure sensitive sensor 13 moves downward, the pressure sensitive sensor 13 is pressed by the installation table 30, and the resistance value of the pressure sensitive sensor 13 changes.

The processing circuit 50 illustrated in FIG. 7 acquires the detection result from the pressure pad 6*pb*L, by acquiring the detection result from the capacitive touch sensor 11 and the resistance value (hereinafter, referred to as a "pressing value") of the pressure sensitive sensor 13. Then, the processing circuit 50 generates information indicating the acquired detection result and supplies the generated information to the computer 2.

Figure 10B:
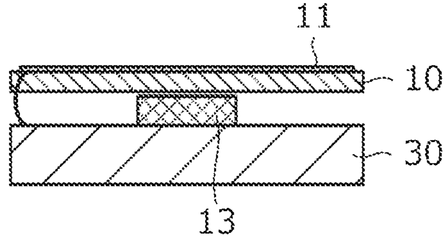
FIG. 10B is a diagram for schematically illustrating another example of the cross-sectional structure of the pressure pad 6_pb_L illustrated in FIG. 8.

FIG. 10B is a diagram for schematically illustrating another example of the cross-sectional structure of the pressure pad 6*pb*L. As illustrated in FIG. 10B, the rigid flexible board or film on which the capacitive touch sensor 11 is mounted may be pasted to the upper surface (outer surface) of the surface member 10. In addition, the capacitive touch sensor 11 may be formed by printing conductive ink on the upper surface of the surface member 10.

Figure 10C:
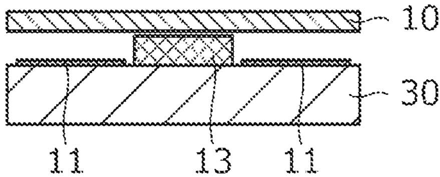
FIG. 10C is a diagram for schematically illustrating still another example of the cross-sectional structure of the pressure pad 6_pb_L illustrated in FIG. 8.
Figure 10D:
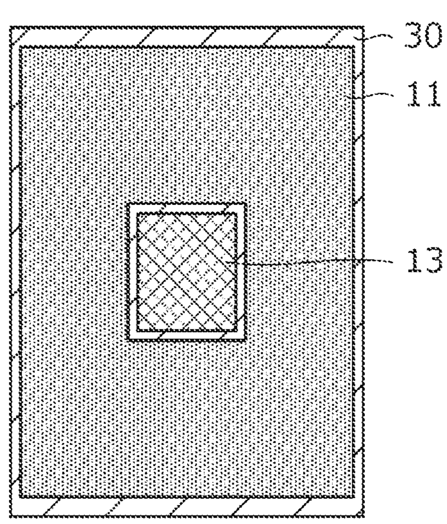
FIG. 10D is a plan view of the pressure pad 6_pb_L according to the example in FIG. 10C.

FIG. 10C is a diagram for schematically illustrating still another example of the cross-sectional structure of the pressure pad 6*pb*L. FIG. 10D is a plan view of the pressure pad 6*pb*L according to the example of FIG. 10C. It should be noted that the illustration of the surface member 10 is omitted in FIG. 10D. In this example, the rigid flexible board or film on which the capacitive touch sensor 11 is mounted is formed in a square shape and is pasted to the upper surface of the installation table 30 such that the pressure sensitive sensor 13 is positioned in a central hollow portion. With such a configuration, the capacitive touch sensor 11 can be used even in the case where it is difficult to arrange the capacitive touch sensor 11 on the surface of the surface member 10. Even in this case, the capacitive touch sensor 11 may be formed by printing conductive ink on the upper surface of the installation table 30.

The processing circuit 50 of the controller 6 transmits information detected by the pressure pads 6*pb*L and 6*pb*R, that is, information detected by the capacitive touch sensor 11 of the pressure pad 6*pb*R, information detected by the pressure sensitive sensor 13 of the pressure pad 6*pb*R, information detected by the capacitive touch sensor 11 of the pressure pad 6*pb*L, or information detected by the pressure sensitive sensor 13 of the pressure pad 6*pb*L, to the computer 2 through the wireless communication circuit 52. Then, based on the information detected by the capacitive touch sensor 11 of the pressure pad 6*pb*R or the information detected by the pressure sensitive sensor 13 of the pressure pad 6*pb*R, the computer 2 outputs the pen pressure value related to the information detected by the pressure sensitive sensor 13 of the pressure pad 6*pb*R or outputs the pen pressure value related to the information detected by the pressure sensitive sensor 13 of the pressure pad 6*pb*L. An example of processing executed by the computer 2 having received, from the processing circuit 50, information indicating the detection results from the pressure pads 6*pb*L and 6*pb*R will be described below.

Figure 11:
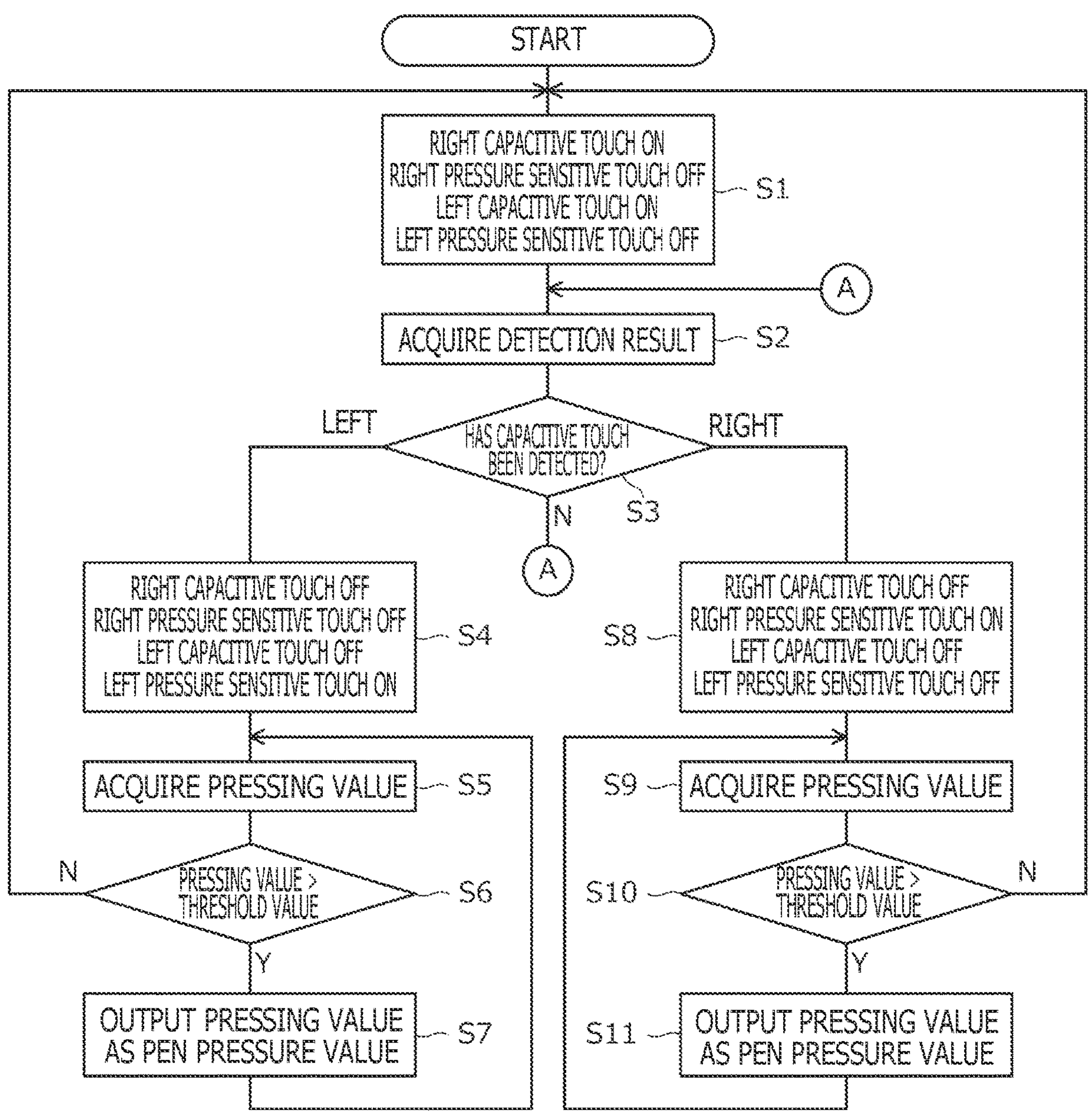
FIG. 11 is a diagram for illustrating processing executed by the computer 2 having received, from a processing circuit 50, information indicating detection results from the pressure pads 6_pb_L and 6_pb_R.

FIG. 11 is a diagram for illustrating an example of processing executed by the computer 2 having received, from the processing circuit 50, information indicating the detection results from the pressure pads 6*pb*L and 6*pb*R. It should be noted that the processing illustrated in FIG. 11 is preferably executed by a device driver of the controller 6 operating in the computer 2. However, it may be executed by a program, such as an application, other than the device driver.

In FIG. 11, "right capacitive touch" refers to a touch operation detected by the capacitive touch sensor 11 of the pressure pad 6*pb*R, "right pressure sensitive touch" refers to a pressing operation detected by the pressure sensitive sensor 13 of the pressure pad 6*pb*R, "left capacitive touch" refers to a touch operation detected by the capacitive touch sensor 11 of the pressure pad 6*pb*L, and "left pressure sensitive touch" refers to a pressing operation detected by the pressure sensitive sensor 13 of the pressure pad 6*pb*L. As illustrated in FIG. 11, the computer 2 first turns on the right capacitive touch and the left capacitive touch (a state in which input of the corresponding information from the processing circuit 50 is accepted) and turns off the right pressure sensitive touch and the left pressure sensitive touch (a state in which input of the corresponding information from the processing circuit 50 is ignored) (S1).

The computer 2 acquires the detection result from the capacitive touch sensor 11 of each of the pressure pads 6*pb*L and 6*pb*R, by referring to the information supplied from the processing circuit 50 (S2). Then, it is determined whether or not the right capacitive touch or the left capacitive touch has been detected, by referring to the acquired detection results (S3).

At S3, the computer 2 which determines that neither the right capacitive touch nor the left capacitive touch has been detected returns to S2 to continue the processing. On the other hand, the computer 2 which determines that the left capacitive touch has been detected turns off the right capacitive touch and the left capacitive touch, while turning on the left pressure sensitive touch (S4). Then, the pressing value of the pressure sensitive sensor 13 of the pressure pad 6*pb*L is acquired by referring to the information supplied from the processing circuit 50 (S5), and it is determined whether or not the acquired pressing value exceeds a predetermined threshold value (S6). The computer 2 which determines that the acquired pressing value exceeds the threshold value outputs the acquired pressing value to the application as a pen pressure value (S7), and then returns to S5 to acquire the next pressing value. On the other hand, the computer 2 which determines at S6 that the acquired pressing value does not exceed the threshold value returns to S1 to repeat the processing.

In the case where it is determined at S3 that the right capacitive touch has been detected, the processing of the computer 2 is similar to that in a case where the left capacitive touch has been detected, except for the difference between the left and right. Specifically, the computer 2 turns off the right capacitive touch and the left capacitive touch, while turning on the right pressure sensitive touch (S8). Then, by referring to the information supplied from the processing circuit 50, the pressing value of the pressure sensitive sensor 13 of the pressure pad 6*pb*R is acquired (S9), and it is determined whether or not the acquired pressing value exceeds the predetermined threshold value (S10). The computer 2 which determines that the acquired pressing value exceeds the threshold value outputs the acquired pressing value to the application as a pen pressure value (S11), and then returns to S9 to acquire the next pressing value. On the other hand, the computer 2 which determines at S10 that the acquired pressing value does not exceed the threshold value returns to S1 to repeat the processing.

When the computer 2 performs the above processing, it is possible to activate one of the pressure sensitive sensors 13 of the pressure pads 6_pb_L and 6_pb_R which is touched first by the user, while inactivating the other pressure sensitive sensor 13, so that the user can operate the controller 6 having the pressure pads 6_pb_L and 6_pb_R without stress. Specifically, in the case where the pressure sensitive sensor 13 without a stroke is used as described above, the pressure sensitive sensor 13 reacts in some cases even if the user does not consciously press it. This is stressful for the user. However, according to the processing described with reference to FIG. 11, the capacitive touch sensor 11 detects one of the pressure pads 6_pb_L and 6_pb_R which is touched first by the user, and the pressure sensitive sensor 13 of only the detected one is activated, so that the reaction of the pressure sensitive sensor 13 as described above can be suppressed and the stress of the user can be reduced.

Figure 12:
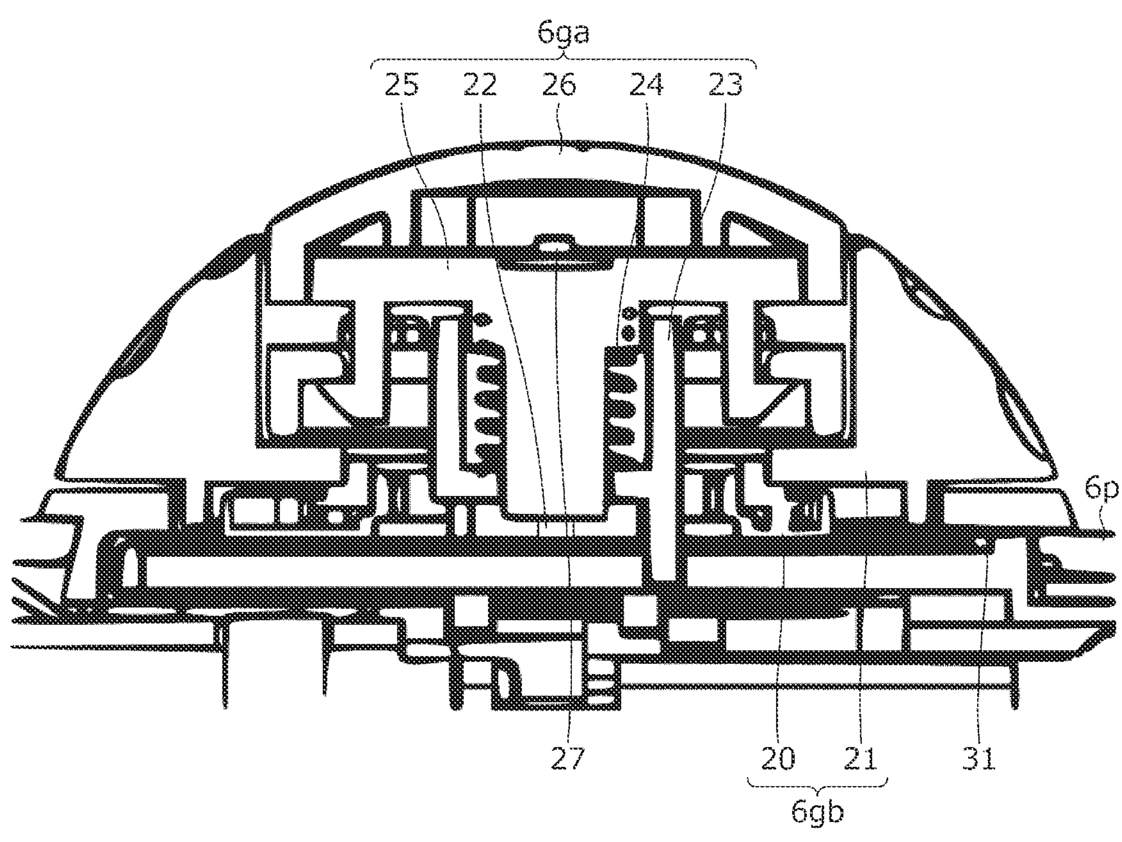
FIG. 12 is a cross-sectional view of a tactile top button 6_ga_ and a dial button 6_gb_.

FIG. 12 is a cross-sectional view of the tactile top button 6_ga_ and the dial button 6_gb_. In addition, FIG. 13A to FIG. 13D are exploded perspective views each illustrating the structures of the tactile top button 6_ga_ and the dial button 6_gb_. Referring first to FIG. 12, the tactile top button 6_ga_ and the dial button 6_gb_ are arranged on an installation table 31 having a flat surface fixed to the casing of the pen part 6_p_. The dial button 6_gb_ includes an encoder 20 and a rotating body 21, and the tactile top button 6_ga_ has a tactile switch 22, a cover 23, an elastic body 24, a pusher 25, and a lens 26. An LED 27 which is one of the one or more LEDs (one or more LEDs to be detected by the computer 2) described above is installed on the upper surface of the pusher 25.

The rotating body 21 is a ring-shaped member arranged with the center portion of the installation table 31 as its center, and is configured to be rotatable around the center by user operation. The encoder 20 is a device for detecting the amount of rotation of the rotating body 21, and includes a circular member arranged to surround the center of the installation table 31 as illustrated in FIG. 13B. The outer periphery of the encoder 20 engages with the inner periphery of the rotating body 21, and the encoder 20 is configured to detect the amount of rotation of the rotating body 21 through this engagement. The cover 23 is a member covering the upper surface of the encoder 20 and is fixed to the installation table 31 and the encoder 20.

Figure 13A:
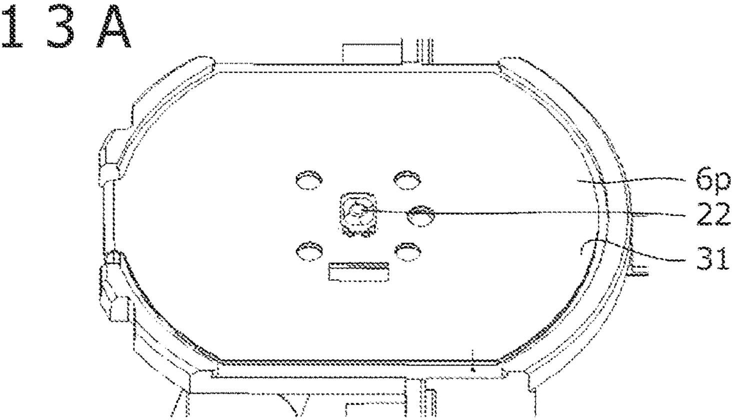
FIG. 13A to FIG. 13D are exploded perspective views each illustrating structures of the tactile top button 6_ga_ and the dial button 6_gb_.
Figure 13B:
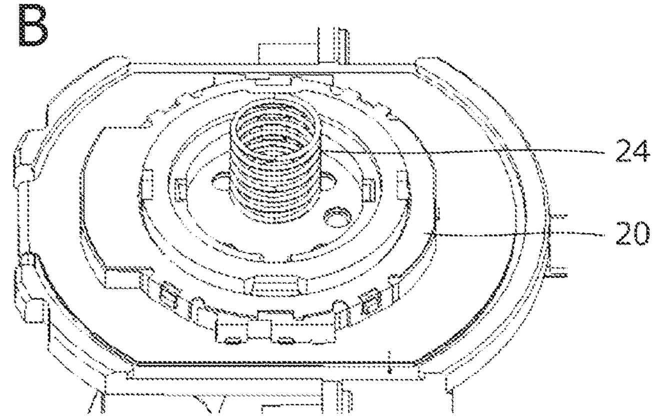
Figure 13C:
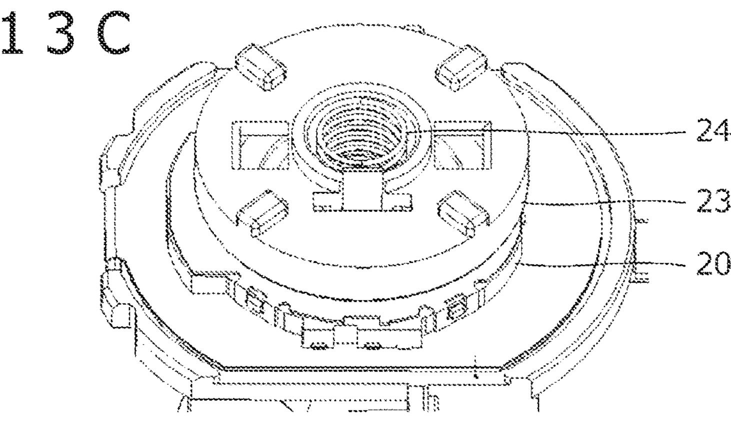
Figure 13D:
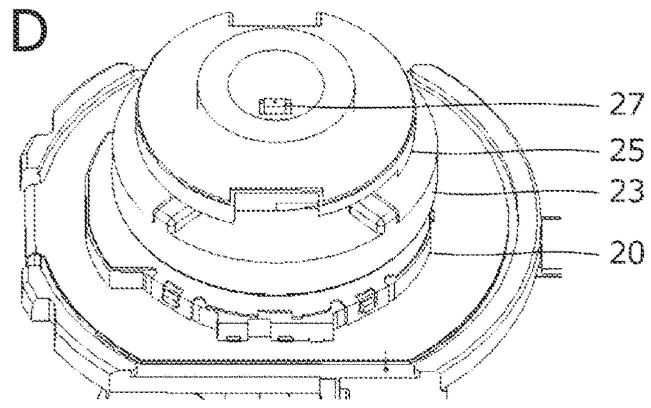

The tactile switch 22 is a switch that can be turned on and off by being pressed, and is arranged in the center of the approximately circular installation table 31 as illustrated in FIG. 13A. The elastic body 24 is an elastic member with one end fixed to the upper surface of the cover 23 and the other end fixed to the lower surface of the pusher 25, and typically includes a spring as illustrated in FIG. 13B. However, the elastic body 24 may include other kinds of elastic bodies such as rubber.

The pusher 25 is a hard member for transmitting the pressing force on the surface of the lens 26 to the tactile switch 22. In addition, the lens 26 is a hemispherical member including a transparent and hard material, and forms the upper surface of the tactile top button 6_ga_. The lens 26 includes a transparent material such that the LED 27 arranged under the lens 26 can be viewed from the outside of the controller 6, thereby allowing the computer 2 to check the light of the LED 27 in the images captured by the cameras 4_a_ to 4_c_.

The pusher 25 and the lens 26 are fixed to each other, are configured to be movable in the normal direction of the installation table 30 in a predetermined range, and are energized outwards by the elastic body 24. With this energizing force, in the case where no force is applied to the lens 26, the tactile switch 22 is in a state where it is not pressed by the pusher 25. On the other hand, when the user presses the lens 26 to move the lens 26 and the pusher 25 downward, the tactile switch 22 is pressed by the pusher 25, and the on/off state of the tactile switch 22 is switched.

The processing circuit 50 illustrated in FIG. 7 acquires the operation states of the tactile top button 6_ga_ and the dial button 6_gb_ by acquiring the amount of rotation detected by the encoder 20 and the on/off state of the tactile switch 22. Then, the processing circuit 50 generates information indicating the acquired operation states and supplies the generated information to the computer 2.

As described above, according to the pen-type controller 6 with a grip according to the present embodiment, the battery 6_gg_, which is a heavy component, is arranged in the grip part 6_g_ instead of the pen part 6_p_. Therefore, the balance of weight is improved, and it becomes possible to reduce a sense of discomfort felt by the user when the user operates the controller 6 by gripping the grip part 6_g_.

In addition, according to the pen-type controller 6 with a grip according to the present embodiment, since the haptic element 6_gf_ is provided on the opposite side of the grip part 6_g_ when viewed from the recess portion 6_ge_, haptics can preferably be given to the middle finger of the user.

In addition, according to the pen-type controller 6 with a grip according to the present embodiment, since the pressure pads 6_pb_L and 6_pb_R including the capacitive touch sensors 11 and the pressure sensitive sensors 13 are provided, it becomes possible to detect a finger of the user touching the surfaces of the pressure pads 6_pb_L and 6_pb_R, the position of the finger on the surfaces, and the pressure applied to the surfaces of the pressure pads 6_pb_L and 6_pb_R, and use the results of the detection to render a 3D object.

In addition, according to the pen-type controller 6 with a grip according to the present embodiment, since the tactile top button 6_ga_ is provided at the upper end of the grip part 6_g_, which is exposed without being hidden by the hand of the user in a normal state, and the LED 27 is arranged therein, it becomes possible to reduce the possibility that the computer 2 fails to track the controller 6.

In addition, according to the tracking system 1 according to the present embodiment, since one of the pressure sensitive sensors 13 of the pressure pads 6_pb_L and 6_pb_R which is touched first by the user can be activated while the other pressure sensitive sensor 13 can be inactivated, the user can operate the controller 6 having the pressure pads 6_pb_L and 6_pb_R without stress.

Although the preferred embodiment of the present disclosure has been described above, it is obvious that the present disclosure is not limited to such an embodiment at all and can be carried out in various forms without deviating from the gist thereof.

DESCRIPTION OF REFERENCE SYMBOLS

1: Tracking system
2: Computer
3: Position detection device
4_a_ to 4_c_: Camera
5: Head-mounted display
6: Pen-type controller with grip
6_g_: Grip part
6_ga_: Tactile top button
6_gb_: Dial button
6_gc_: Grab button
6_gd_L and 6_gd_R: Tactile button
6_ge_: Recess portion
6_gf_: Haptic element
6_gg_: Battery

**6*gh***: Main board
**6*p***: Pen part
**6*pa***: Nib
**6*pb*L and 6*pb***R: Pressure pad
**6*pc*L and 6*pc***R: Shift button
**6*pd***: USB connector
**6*pe***: Pen tip electrode
**6*pf***: Printed circuit board assembly
**6*pg***: Flexible printed circuit board
10: Surface member
11: Capacitive touch sensor
12: Elastic body
13: Pressure sensitive sensor
20: Encoder
21: Rotating body
22: Tactile switch
23: Cover
24: Elastic body
25: Pusher
26: Lens
30, 31: Installation table
50: Processing circuit
51: Pen pressure sensor
52: Wireless communication circuit
53: Power supply circuit
60: Desk
61: Desk chair
101: CPU
102: Storage device
103: Input device
104: Output device
105: Communication device The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller that communicates with a computer configured to control a three-dimensional object in an extended reality space and that is operated away from a surface to input a line of the three-dimensional object, the controller comprising:

a pen part that is formed in a pen shape;

a first pressure pad that, in operation, detects a first pressure that is transmitted to the computer, wherein the computer is configured to control a thickness of the line of the three-dimensional object in the extended reality space based on the first pressure, the first pressure changing according to an operation made in mid-air by a user to change the thickness of the line of the three-dimensional object in a state where the user grips the pen part with a first finger and a second finger in a pinching manner; and a second pressure pad that, in operation, detects a second pressure that is transmitted to the computer configured to control the thickness of the line of the three-dimensional object in the extended reality space based on the second pressure, the second pressure changing according to the operation made in mid-air by the user to change the thickness of the line of the three-dimensional object in the state where the user grips the pen part with the first finger and the second finger in the pinching manner; and a grip part that intersects an axial direction of the pen part and is in contact with a palm of the user, wherein the first pressure pad is disposed on a first side surface of a pen portion corresponding to a thumb contact region and the second pressure pad is disposed on a second side surface of the pen portion corresponding to an index finger contact region, such that, in a state where a palm contacts the grip part, a thumb and an index finger directly press the first and the second pressure pads, respectively, and a line thickness in the extended reality space is controlled based on the first pressure detected by the first pressure pad or the second pressure detected by the second pressure pad, wherein the first pressure pad is different from the second pressure pad and operable independently of the second pressure pad to detect the first pressure independently of the second pressure different from the first pressure, wherein the first pressure pad includes a first capacitive touch sensor and a first pressure sensitive sensor, wherein the second pressure pad includes a second capacitive touch sensor and a second pressure sensitive sensor, and wherein the controller is configured such that detection of a touch by the first capacitive touch sensor activates the first pressure sensitive sensor to detect the first pressure, and detection of a touch by the second capacitive touch sensor activates the second pressure sensitive sensor to detect the second pressure.

2. The controller according to claim 1, comprising:

a battery that is arranged in the grip part along a longitudinal direction of the grip part.

3. The controller according to claim 2, further comprising:

a haptic element, wherein the haptic element is arranged in the grip part.

4. The controller according to claim 3, wherein the grip part has a first side surface positioned on a pen tip side of the pen part and a second side surface positioned on a pen rear side of the pen part, and wherein the haptic element is arranged in a vicinity of the first side surface.

5. The controller according to claim 4, wherein the grip part has a recess portion provided in a vicinity of the second side surface.

6. The controller according to claim 5, wherein the battery is arranged between the haptic element and the recess portion.

7. The controller according to claim 3, wherein the haptic element is arranged in the grip part in a vicinity of a portion gripped by the user.

8. The controller according to claim 3, wherein the haptic element is arranged in the grip part at a position adjacent to the pen part.

9. The controller according to claim 3, wherein the grip part has a first portion including a first end adjacent to the pen part and a second portion including a second end away from the pen part, and wherein the haptic element is arranged in the second portion of the grip part.

10. The controller according to claim 2, wherein the grip part has a button that operable by the user, and wherein the button includes:

a tactile switch that, in operation, is turned on and off, and a light emitting diode which, in operation, detects the controller by the computer.

11. The controller according to claim 10, wherein an upper surface of the button includes a transparent member, and wherein the light emitting diode is arranged under the transparent member.

12. The controller according to claim 2, wherein the grip part has a first portion including a first end adjacent to the pen part and a second portion including a second end away from the pen part, and wherein the battery is arranged in the second portion of the grip part.

13. The controller according to claim 2, wherein the pen part has a circuit, and wherein the battery, in operation, supplies electric power to the circuit.

14. The controller according to claim 1, comprising:

a first communication device that, in operation, transmits the first pressure detected by the first pressure pad or the second pressure detected by the second pressure pad.

15. The controller according to claim 14, wherein the first communication device, in operation, transmits the first pressure detected by the first pressure pad or the second pressure detected by the second pressure pad, to the computer configured to control the thickness of the line of the three-dimensional object in the extended reality space based on the first pressure detected by the first pressure pad or the second pressure detected by the second pressure pad.

16. The controller according to claim 14, further comprising:

a pen pressure sensor that, in operation, detects a third pressure applied to a pen tip of the pen part; and a second communication device that, in operation, transmits the third pressure detected by the pen pressure sensor, wherein the second communication device is different from the first communication device.

17. The controller according to claim 1, wherein the controller includes a pen tip portion, wherein the pen tip portion is a tip of the pen part and receives a pen pressure when an user presses the pen tip portion against a surface, and wherein the pen tip portion is interposed between the first pressure pad and the second pressure pad.

18. A computer that controls a three-dimensional object in an extended reality space and communicates with a controller including a pen part that is formed in a pen shape, a first pressure pad that includes a first pressure sensitive sensor that detects a first pressure and is provided in the pen part, a second pressure pad that includes a second pressure sensitive sensor that detects a second pressure and is provided in the pen part, a grip part that intersects an axial direction of the pen part and is in contact with a palm of a user, and a pen tip portion, the first pressure pad being different from the second pressure pad and operable independently of the second pressure pad to detect the first pressure independently of the second pressure different from the first pressure, the first pressure pad including a first capacitive touch sensor and a first pressure sensitive sensor, the second pressure pad including a second capacitive touch sensor and a second pressure sensitive sensor, the controller being configured such that detection of touch by the first capacitive touch sensor activates the first pressure sensitive sensor to detect the first pressure, and detection of touch by the second capacitive touch sensor activates the second pressure sensitive sensor to detect the second pressure, the first pressure pad being disposed on a first side surface of a pen portion corresponding to a thumb contact region and the second pressure pad is disposed on a second side surface of the pen portion corresponding to an index finger contact region, such that, in a state where a palm contacts the grip part, a thumb and an index finger directly press the first and the second pressure pads, respectively, the computer comprising:

a communication device that, in operation, receives information transmitted from the controller; and a processor, wherein the processor, in operation, controls, based on the information received by the communication device, outputting of a line thickness in the extended reality space, and wherein the line thickness in the extended reality space is controlled based on the first pressure detected by the first pressure pad or the second pressure detected by the second pressure pad.

* * * * *